United States Patent
Roth

[15] 3,690,748
[45] Sept. 12, 1972

[54] MOTION PICTURE CAMERA WITH A FADE-OVER DEVICE

[72] Inventor: Johann Roth, Schwabhausen, Germany

[73] Assignee: Niezoldi & Kramer, GmbH, Munich-Allach, Germany

[22] Filed: June 30, 1970

[21] Appl. No.: 51,074

[30] Foreign Application Priority Data

July 2, 1969 Germany..........P 19 33 579.6

[52] U.S. Cl....................................352/91, 352/217
[51] Int. Cl................................................G03b 21/36
[58] Field of Search..............................352/91, 217

[56] References Cited

UNITED STATES PATENTS

| | | |
|---|---|---|
| 3,494,691 | 2/1970 | Katsuyama..............352/91 X |
| 3,549,249 | 12/1970 | Katsuyama..............352/91 X |
| 3,514,197 | 5/1970 | Sho..............................352/91 |
| 2,566,770 | 6/1951 | Moore..........................352/91 |

*Primary Examiner*—S. Clement Swisher
*Attorney*—Ernest F. Marmorek

[57] ABSTRACT

A motion picture camera having diaphragm, a winding spool, a device for measuring off the same length of film for a fading-out film section and a subsequent fading-over film section, and motor means for driving the camera, which comprises a fade-over device having a selector disc adapted to be moved into a plurality of fade-over phases, the fade-over device, depending on the position of the selector disc being adapted to initiate, carry out, and complete all electric and mechanical functions necessary for the respective preselected fade-over phase.

9 Claims, 5 Drawing Figures

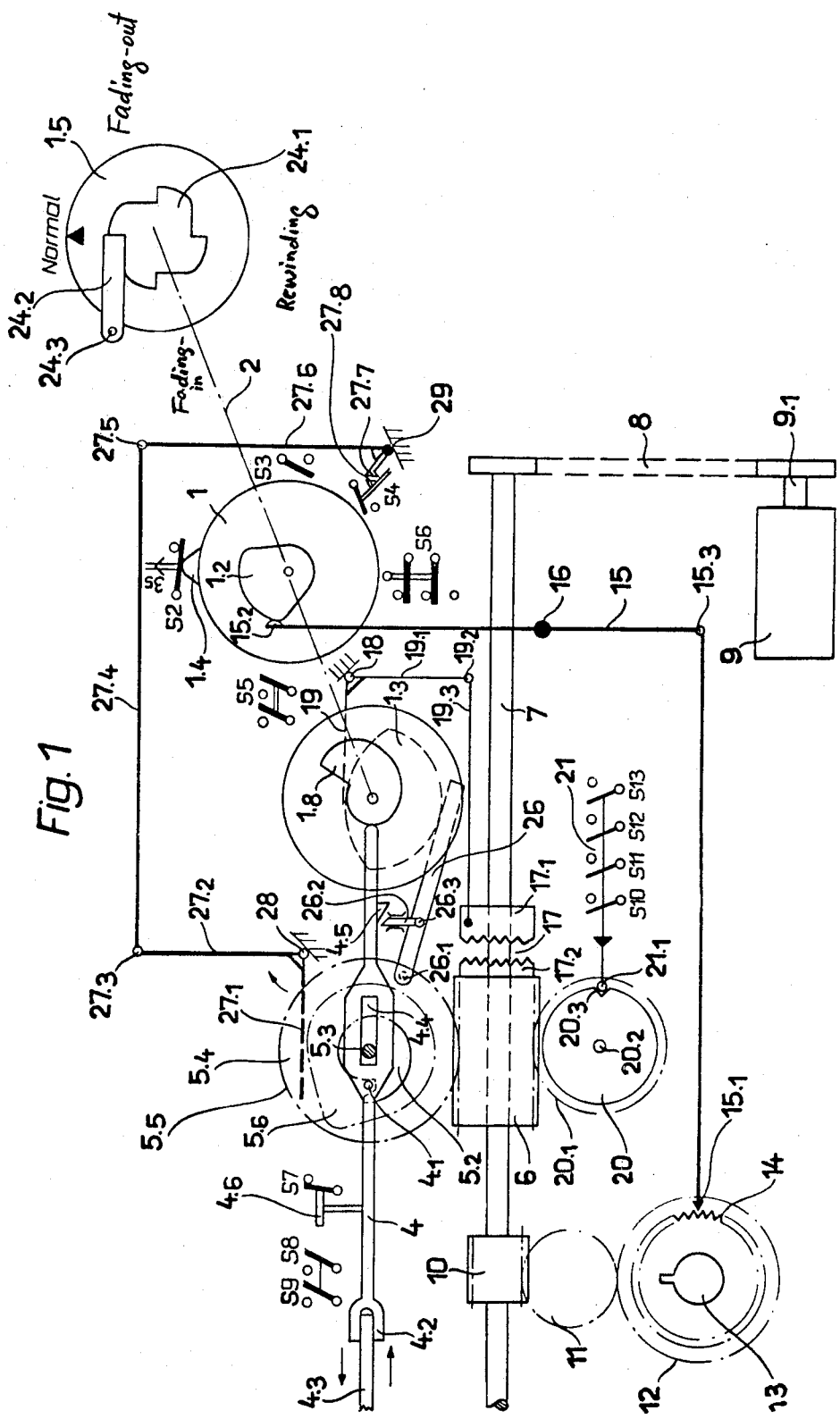

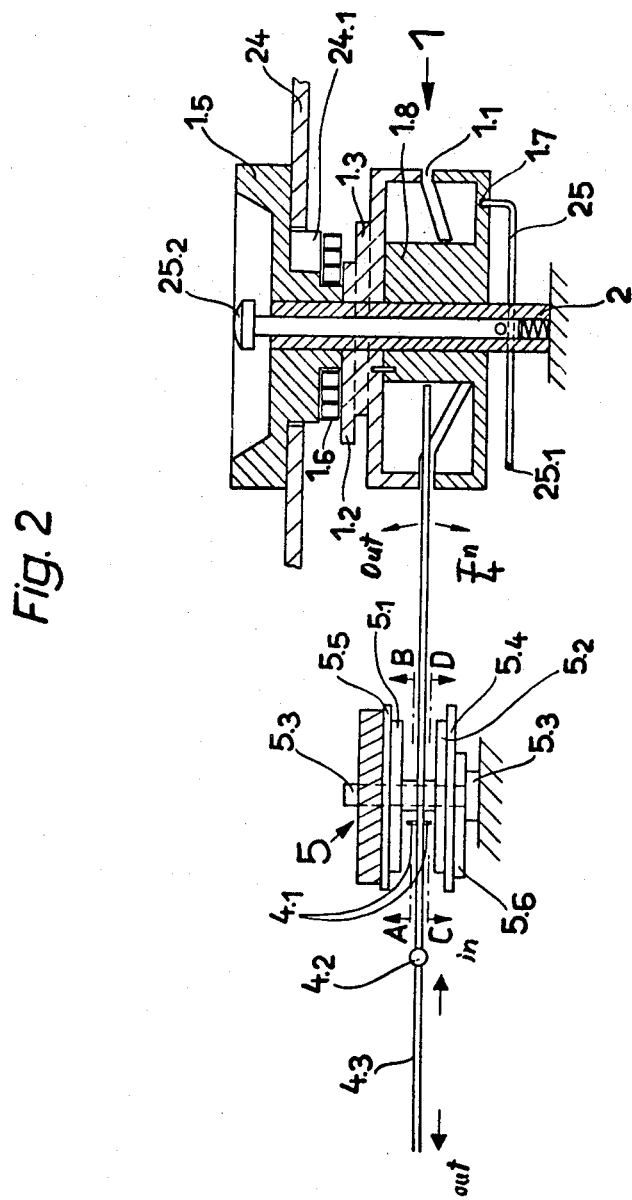

MOTION PICTURE CAMERA WITH A FADE-OVER DEVICE

BACKGROUND OF THE INVENTION

The present invention relates to a motion picture camera with a winding spool which is preferably arrested against reverse movement and with a device for "measuring off" the same length for the film sections provided for the fade-out and the subsequent fade-over, in combination with an electro-motor camera drive.

The heretofore known fade-over devices of this type, for a complete fade-over of two film scenes require, in addition to the actuation of the release of the camera, actuation of further switching and coupling members which are different from each other and take care of the fade-over phases for reversing the direction of movement of the camera drive mechanism and for its drive connection in proper time and function with the film switching and film transporting members of the camera.

These manipulations require very high concentration of the user of the camera, which cannot be expected for instance from an amateur who would like to film in an unincumbered manner as far as possible.

It is, therefore, an object of the present invention to provide a motion picture camera of the above-described general type which will overcome the above-mentioned disadvantages.

It is another object of the present invention to provide a motion picture camera of the above-outlined type which permits a simple and easily recognizable manipulation of the adjusting members of the camera for the complete fade-over of two film scenes as well as for the fading-in or fading-out of a film scene.

BRIEF SUMMARY OF THE INVENTION

The problems underlying the present invention have been solved in the motion picture camera according to the present invention, by a fade-over device associated with the camera and comprising a selector disc as control member, said fade-over device initiating, carrying out, and completing all electrical and mechanical functions which guarantee the execution of the pre-selected fade-over phase, depending on the position of the selector disc preparing the respective fade-over phase.

With a thus designed camera the desired fade-over phase can be preselected so that the complete fade-over of two film scenes, or the fading-in and fading-out of a film scene, may be carried out. The term fade-over phase is meant to include the fading-out of a film scene, the reverse transport of the pre-spooled film section for the fade-out while the shutter is closed, or the fading-in of a new film scene, if necessary while using the film section exposed with the faded-out film scene.

For purposes of guaranteeing the functionally proper start and course of the respective preselected fade-over phase, the selector disc is provided with control curves for the initiation of the automatic fading-out and fading-in in the proper phase, for arresting of the film winding in the proper phase, and for the fixing of the shutter or diaphragm closing position during the reverse movement of the film, as well as at least one contact cam for switching over the electromotor camera drive to the respective fade-over phase.

For the phase-proper course of the fade-out or fade-in sequence as well as the reverse film transport with closed shutter, a control disc and a switch disc are provided which can be connected in the proper phase with the motor drive of the camera via a coupling actuated by the selector disc, and which on one head set in motion an adjusting member effecting the fading-in or fading-out respectively, and on the other hand maintain the respective required drive current circuits of the camera closed during the entire course of the respective phase upon closing of the circuits at the beginning of the pre-selected fade-over phase.

In order to make possible a sliding transition of one film scene into the fade-out scene, the fading-out event can be preselected prior to the beginning of the film scene to be ended by the fading-out phase. This can be effected by means of a manual control which is elastically connected to the selector disc in such a way that it tends to bring the selector disc into a position preparing the fading-out event upon being adjusted for "fading-out". The selector disc itself first remains in the starting position guaranteeing the normal run of the film, by arresting means associated therewith, and is released only by actuation of a manual release during the filming of the respective scene so that it is transferred to its fading-out position in an abrupt manner by the elastic member tensioned by the manual control.

The end of the fading-in phase can be made known to the user of the camera by the phase-proper opening of the drive circuit of the camera. This however, is disadvantageous in as much as the faded-in film scene is abruptly interrupted by the de-activation of the camera drive. Therefore, it is advantageous to associate switching means with the fade-over device which upon fading-in of a possibly previously faded-out film scene keeps the drive circuit of the camera closed until the release is actuated. In this way, also a sliding transition of the fade-in phase into the film scene begun by the fading-in is assured.

BRIEF DESCRIPTION OF THE DRAWING

The invention is illustrated by way of example in the attached drawing, in which:

FIG. 1 diagrammatically illustrates a fade-over device for a camera, in accordance with the present invention, showing the various switching and control members in functional cooperation;

FIG. 2 is a top view of the control and actuating members of the device for the motor-driven adjustment of the shutter or diaphragm of the camera;

DETAILED DESCRIPTION OF A PREFERRED EMBODIMENT

Figures 3A, 3B:
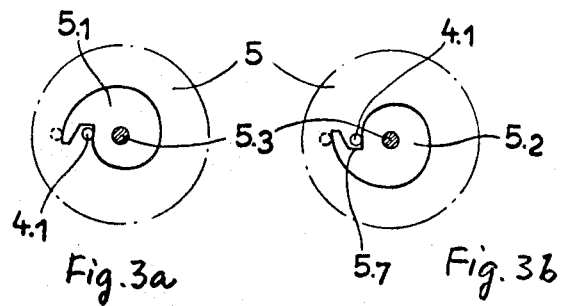
FIGS. 3a and 3b illustrate the closing and opening curve of the control disc effecting the motor-driven adjustment of the shutter, taken along the sections A—B and C—D respectively in FIG. 2.

Referring now to the drawing in detail, and FIGS. 1 and 2 in particular, the fade-over device of a motion picture camera illustrated therein comprises a selector disc 1 by means of which each single fade-over phase necessary for a complete fade-over can be selected. Selector disc 1 which is rotatable about a fixed axis 2 in the housing of the camera, performs various control functions. Thus, a curved groove 1.1 (see FIG. 2) on the circumference of the selector disc 1 cooperates with a shutter or diaphragm adjusting member 4, designed as a slide. Adjusting member 4 has a tracer pin 4.1 which by the selector disc from an idling position is brought into engagement with a closing curve 5.1 or an opening curve 5.2 of a motor-driven control disc 5, which is brought about by a non-positive abutment of the tracer pin 4.1 against the circumference of the respective curve 5.1 or 5.2.

Control disc 5 consists of a pair of disc 5.4 and 5.5 which are located on a common shaft 5.3 fixedly journalled in the housing of the camera and from the sides of which which face each other the radially effective curves 5.1 and 5.2 axially project. The circumference of disc 5.5 is provided with teeth which are in meshing engagement with a worm 6. This worm is — as a member driving the control disc 5 — freely rotatably mounted on a drive shaft 7 of the camera. Shaft 7 is rotated via a reduction gear train indicated by the reference numeral 8 (for instance a belt drive) by a shaft 9.1 of an electromotor 9 which drives the film switching mechanism as well as the film transport mechanism including the winding spool. A worm 10 sitting on this shaft is drivingly connected with a gear 12 via a worm wheel 11, which gear through the intervention of a frictional connection (not shown) drives a follower 13 which is adapted to be coupled with the hub of the film winding spool (not shown). It may be assumed that the film winding spool is supported as part of a portion of a film pack in the latter so as to be arrested against reverse movement of the spool. This requires for the advance movement of the film section intended for the fade-over phase an arresting of the follower 13 during this fade-over phase. For this purpose between the follower 13 and the above-mentioned frictional connection preceding the same, a locking or arresting wheel 14 is provided which cooperates with a spring loaded arresting slide 15.1 during the fade-out and, if necessary, also during the re-winding phase. Arresting slide 15.1 is part of a linkage 15 pivotable about a fixed axis 16, which linkage on one hand rests against the circumference of a radially effective control curve 1.2 of selector disc 1 via a traces pin 15.2, and on the other hand is pivotally connected to the arresting slide 15.1 at 15.3.

A gear coupling or clutch 17 serves for driving the worm 6 which is loosely journalled on shaft 7 and has a driving portion 17.1 which is slidably guided on shaft 7. This portion 17.1 has one end face thereof provided with gear teeth which in coupled condition drivingly engage the gear teeth associated with an provided on the driven portion 17.2 of the clutch 17. The teeth of both coupling portions are pointed that in case the drive portion 17.2 becomes blocked the driving portion 17.1 of the coupling which is held in coupled position by the force of a spring, can resiliently disengage.

Clutch 17 is actuated by a control curve 1.3 associated with selector disc 1, the circumference of said curve being engaged by a tracer lever 19 which is pivotable about a stationary axis 18 and the lever arm 19.1 of which at 19.2 cooperates with an adjusting slide 19.3 for displacing the drive portion 17.1 of the clutch.

Worm 6 is engaged via a worm wheel 20.1 by a switching disc 20 which is rotatable about an axis 20.2, said disc 20 being provided with a switching notch 20.3 into which a push rod 21.1 of a set of switches 21 falls by spring force when switching disc 20 occupies its starting position according to FIG. 1.

The shutter or diaphragm adjusting slide 4 actuated by closing curve 5.1 or opening curve 5.2 is, by means of a joint 4.2 formed thereon connected to a transmitting member 4.3 which transmits the closing and opening movement of the slide 4 onto the adjusting member of an adjustable rotatable shutter effecting the relative movement of the shutter blades, or onto the adjusting member of a wiper diaphragm which may be brought into the picture beam of rays. It is also possible to connect the transmission member 4.3 with the exit terminal of a slide or rotary resistor which is arranged in the circuit of an exposure control device comprising as control member a photoelectric transformer and which influences the same in the manner of a continuous fading-out or fading-in respectively.

Figure 5:
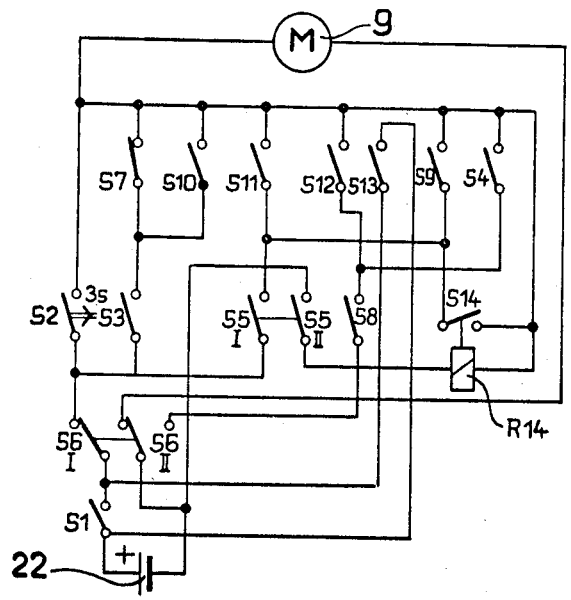
FIG. 5 shows the drive circuits and the switches of the device of opening and closing said drive circuits in the proper phase.

The fade-over device of the camera operates as follows: For the normal operation of the camera, for instance with a frequency of 18 pictures per second, the selector disc 1 occupies the position shown in FIG. 1 in which its control cam 1.4 closes a switch S 2 in the drive circuit of the camera. If the user of the camera presses the release of the camera, he closes the release switch S 1 resulting in the following flow of current according to FIG. 5: From the plus pole of source 22, via the closed release switch S 1, contact I of the change-over switch S 6, closed switch S 2, winding of drive motor 9, contact II of switch S 6 to the minus pole of source 22.

Consequently, motor 23 runs continuously in the starting position of disc 1 during actuation of the release of the camera and drives the follower 13 for the winding spool via the gear train 9.1, 8, 7, 10, 11 and 12.

If, for instance a scene is to be faded out which forms the conclusion of a train of scenes in sequence, the user of the camera actuates a manually operable member 1.5 which is rotatably journalled on the axis 2 of selector disc 1, which member 1.5 — freely rotatable by an angle of approximately 90° with respect to the selector disc 1 — is journalled on the shaft 2 penetrating an opening of the housing wall 24 of the camera. The manually operable member 1.5 which is accessible from the outside and in this instance in the form of a disc is rotated by 90° in clockwise direction with respect to the selector disc 1 for purposes of preselecting the fading-out phase, until it is arrested in the preselected position by a spring-loaded arresting mechanism associated with it and with the housing wall 24 of the camera. This arresting mechanism comprises an arresting disc 24.1 fixedly connected with manually operable control member 1.5 and provided with four arresting recesses offset with respect to each other by 90° each and with a spring-loaded arresting latch 24.2 which is pivotally journalled about an axis 24.3 at housing 24. A torsion spring, not shown in the drawing, and wound about axis 24.3 holds latch 24.2 in engagement with the circumference of arresting disc 24.1 so that the same in the normal position shown and upon each further rotation of the manually operable member 1.5 by 90° in clockwise direction, can fall into one of the four recesses of disc 24.1 whereby the control member 1.5 is simultaneously blocked against reverse rotation.

A spirally wound leaf spring 1.6 (FIG. 2) provided between member 1.5 and selector disc 1 as an elastic connecting member and tensioned during rotation of member 1.5 tends to turn the selector disc by the same amount, i.e. into the fading-out position. Selector disc 1, however, is prevented from rotation by means of an arresting bar or bolt 25 arresting disc 1 in the starting position, said bar 25 being pivotable about a fixed axis 25.1 and engaging a recess 1.7 in the body of disc 1 under the force of a spring. Bar 25 is drivingly connected with a pressure pin 25.2 which penetrates the hollow axis 2 of the selector disc, and projects from the camera housing concentrically with respect to the manually operable member 1.5.

At the beginning of filming a scene to be faded-out the user of the camera actuates the release of the camera whereupon in view of the closing of release switch S 1 the film strip — driven by a film switch mechanism not shown — is first exposed with the proper exposure value for instance by means of a diaphragm control device built into the camera. As soon as the user of the camera wants to initiate the fading-out process, he presses the pressure pin 25.2 which lifts the latching bar 25 from recess 1.7 so that the selector disc 1 is snapped into the fading-out position by the tensioned leaf spring 1.6. In this position, as well as in other operating positions, the selector disc 1 is arrested by the arresting mechanism 24.1, 24.2.

In the fading-out position the selector disc 1 occupies a position which is offset with respect to the starting position by 90° in clockwise direction. In this position the switch S 3 is closed by the cam 1.4 associated with disc 1. For purposes of maintaining the drive current circuit during the movement of the cam 1.4 of disc 1 into the fading-out position a switch S 2 is provided with a release delay of approximately three seconds. During this time period the cam 1.4 of the disc 1 which has been snapped into the fading-out position by the leaf spring 1.6, surely has closed the switch S 3. With the closing of this switch the flow of the current is as follows: From the plus pole of current source 22, via closed release switch S 1, contact I of the change-over switch S 6, closed switch S 3, closed switch S 7, winding of the drive motor 9, contact II of switch S 6, to the minus pole of the current source 22.

With the rotation of selector disc 1 into the fading-out position, linkage 15 is pivoted into its arresting position by control curve 1.2, in which position the arresting slide 15.1 engages the arresting wheel 14 to thereby arrest follower 13 driving the winding spool and prevent the same from rotating. Consequently, the film strip driven by the film switching mechanism (not shown), during the fading-out phase in which it is not being wound up, is transported into the free space of the film chamber of the camera or into the free chamber of the film pack if such is being used. The length of the film section to be faded over is to be selected in such a way that the same becomes threaded into the free space of the film chamber or film pack surrounding the winding spool, without damaging the film section.

Within the range marked "fading-out", the axially effective groove 1.1 at the circumference or selector disc 1 has tilted the diaphragm adjusting member 4 about axis 4.2, according to FIG. 2, in the direction of the arrow "out" while the tracer pin 4.1 comes into the range of the motor driven closing curve 5.1. The drive of the curve 5.1 during the fading-out phase is effected by motor 9, and more specifically via gear clutch 17 which has been brought into engaging position by the curve 1.3 of the selector disc 1 resting in the fading-out position, through the intervention of the clutch linkage 19.

The diaphragm adjusting member 4 taken along by the closing curve 5.1 in the direction of the arrow "out", via the transmitting member 4.3 actuates the adjusting member of an adjustable rotational shutter, of a wiper diaphragm, or of an adjustable resistor in the exposure meter circuit of the camera in the sense of a continuous fading-out of the exposure beam of rays. The switching disc 20 which is likewise set in rotation by drive motor 9 in view of the engaged clutch 17, upon starting presses the spring-loaded pusher rod 21.1 out of notch 20.3 whereby the same comes to rest against the circumference of disc 20. In this way switches S 10 to S 13 of the set of switches 21 are closed. The drive current circuit is thus maintained during the fading-out phase by switch S 10 — upon opening of switch S 7 in view of the longitudinal movement of the diaphragm adjusting member 4 into the fading-out position (direction of arrow "out"). The flow of the current is: From the plus pole of current source 22, via the closed release switch S 1, contact I of change-over switch S 6, closed switch S 3, closed switch S 10, motor winding 9, contact II of switches S 6, to the minus pole of source 22.

Upon start of the movement of disc 20 the user of the camera can release the release S 1 of the camera, since the drive current circuit is maintained by means of the switch S 13 closed by disc 20. The flow of the current not is: From the plus pole of current source 22, via closed switch 13, contact I of change-over switch S 6, closed switch S 3, closed switch S 10, motor winding 9, contact II of switch S 6, to the minus pole of source 22.

The fading-out phase is finished upon completion of one revolution of closing curve 5.1 and of switching disc 20. That portion of the closing curve 5.1 (FIG. 3) which projects radially the most has brought the tracer pin 4.1 into the position illustrated in dash lines whereby the diaphragm adjusting member 4 has reached its closing position, member 4 sliding by means of the guiding slot 4.4 on the shaft 5.3 of control disc 5 connecting the two curves 5.1 and 5.2. In this position — via disc 20 having again reached its starting position — the drive current circuit is opened and thereby the drive of the camera is stopped. This is accomplished by opening of switch 10 in view of the engagement of notch 20.3 of disc 20 by the push rod 21.1 of switch set 21.

If the faded-out film section is to be spooled back for fading-over purposes, the selector disc 1 is rotated further by 90° in clockwise direction by means of the manually operable actuating member 1.5. Since the bar 25 is effective only in the starting position of the selector disc 1, the latter is taken along without time delay by the leaf spring 1.6 upon rotation of member 1.5.

In the reverse or back spooling or winding position, the follower 13 for the winding spool remains arrested against further rotation in view of the arresting slide 15.1 engaging the arresting wheel 14. Simultaneously, an arresting lever 26 which is tiltable about a fixed axis 26.1 is released by the curve 1.3 of selector disc 1, said lever 26—following the curve—tilting upwardly under the influence of a spring thus causing the latch 26.2 connected to lever 26 at 26.3 and guided in a straight path, to catch behind the nose portion 4.5 of the diaphragm adjusting member 4 and to arrest the same in the fading-out position. The diaphragm adjusting member 4 itself has been tilted back into the idling position by means of the curve groove 1.1 of selector disc 1 (range "Rewinding"), in which position the tracer pin 4.1 does not touch the curves 5.1 and 5.2 of the control disc 5. The gear clutch 17 remains closed for driving switching disc 20.

During rotation of the selector disc 1 from the fading-out position into the rewinding position switch S 4 is brought into its closing position by the cam 1.4 while passing by. An arresting cam 27.8 associated with this switch S 4 catches behind a spring-loaded arresting latch 27.7 cooperating with the cam, which latch arrests switch S 4 in its closing position. When the selector disc has reached its position "rewinding" its control cam 1.4 places the change-over switch S 6 into a position reversing the poles of the motor leads to motor 9.

The diaphragm adjusting member 4 in its closing position closes by means of a control finger 4.6 pertaining thereto, the switches S 8 and S 9 and more specifically after finger 4.6 has released switch S 7 which then occupies its open position.

Switch S 8 which is located in the rewinding circuit is actuated by the control finger 4.6 of the diaphragm adjusting member 4, performs a safety function since it permits closing of the rewinding circuit only if prior thereto the diaphragm adjusting member 4 has been transferred to its closing position by means of the drive motor 9 of the camera, i.e. by means of the closing curve 5.1 while simultaneously winding the film section to be faded out into the film chamber or pack.

For purposes of initiating the rewinding process the user of the camera presses the release of the camera and thereby closes the release switch S 1. The flow of current is as follows: From the plus pole of the source 22, via the closed release switch S 1, contact I of the change-over switch S 6 in its right-hand control position, motor winding 9, closed switch S 4, closed switch S 8, contact II of the change-over switch in its right-hand control position, to the minus pole of the source 22.

Motor 9, in view of the reversal of the poles by means of the change-over switch S 6, starts running in opposite direction and thereby moves the film advancing or feeding mechanism in reverse transporting direction so that the faded-out film section is transported back and winds onto the supply spool, which generally is not driven. The reverse movement or back transport of this film section is made possible when using a winding spool arrested against reverse rotation, by arresting the follower 13 associated therewith during the fading-out phase so that the film section passed into the free film chamber or pack can be removed for the reverse transport at any time.

Disc 20 likewise driven in opposite direction presses the push rod 21.1 out of notch 20.3 to thereby transfer the set of switches 21 into its closing position. In this way — as during the fading-out process — the release switch S 1 is bridged by switch S 13 which maintains the rewinding circuit until completion of the rewinding process, i.e. until push rod 21.1 falls into the notch 20.3

Upon start of the control disc 5 likewise driven in opposite direction by means of motor 9, the arresting of switch S 4 which had been brought into closing position by control cam 1.4, will be lifted by means of a linkage 27 tracing its control curve 5.6. Linkage 27 consists of a double-arm lever which is tiltable about a fixed joint 28. One arm 27.1 of said double-arm lever rests against and traces the control curve 5.6 under the influence of a spring, while the other arm 27.2 is pivotally connected at 27.3 with a control rod 27.4 which engages at 27.5 a second lever 27.6 which is pivotable about a fixed joint 29 to thereby lift the arresting latch 27.7 from engagement with the arresting cam 27.8 of switch S 4 as soon as the tracer arm 27.1 is lifted by the protruding nose of the control curve 5.6. In this way switch S 4 reaches its open position immediately upon start of the rewinding process.

This is necessary in order to prevent the user of the camera from continuing the rewinding at will by actuating the release S 1. For in view of the opening of switch S 4 the rewinding circuit is opened at any rate — even with closed release S 1 — upon completion of one revolution of disc 20, by means of the switch S 12 of the set of switches 21, which is arranged parallel to switch S 4. This guarantees that upon rewinding of the entire exposed film section pre-spooled for the fading-over phase, the motor drive of the camera is automatically switched off so that for the fading-in of a new film scene after rewinding, the entire film section exposed with the faded-out film scene is available.

In addition to the above, the automatic switching off of the camera drive after the pre-winding and the subsequent rewinding of exactly the same length of film, makes possible the universal use of the fading-over device for cameras with winding hubs that can be rotated in both directions as well as cameras with winding hubs that are blocked against reverse rotation. For only by exactly limiting the length of the film section to be faded-over can it be guaranteed with cameras of the last-mentioned type that automatically only the same length of film is transported back that during the previous motor-driven fading-out phase has been pushed into the winding space of the film chamber or film pack, but has not been wound up.

If a film scene is to be started by continuous fading-in, for which as explained above the rewound film section exposed with the faded-out film scene can be used, the selector disc 1 is rotated by 90° in clockwise direction into the fading-in position in which its control cam 1.4 closes the double-pole switch S 5. Simultaneously, switch S 6 which reverses the poles of the current leading to motor 9, reverts to its position assuring forward movement of motor 9.

Curve 1.3 releases the arresting member 26 of diaphragm adjusting member 4 in the closing position, effective during the reverse movement of the film, and curve 1.2 of selector disc 1 removes the latching members 14, 15.1 of the follower 13 for the film winding spool. Groove 1.1 in the fading-in position of the selector disc 1— acting upon the right-hand end of the diaphragm adjusting member 4— has tilted the latter according to FIG. 2 into the direction of the arrow "IN" (range "Fading-in") and has thereby brought the tracer pin 4.1 into engagement with the opening curve 5.2 against whose circumference it rest under spring force.

Figure 4:
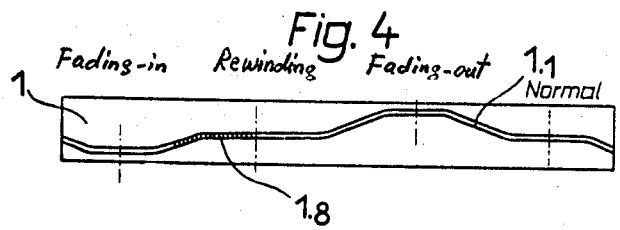
FIG. 4 shows a development of the curved groove of the circumference of the selector disc of the camera, said groove selectively interconnecting the adjusting member of the shutter with the closing or opening curve of the motor-driven control disc.

If prior to fading-in no motor-driven closing movement of the diaphragm adjusting member 4 has taken place, the latter will be moved into the closing position by means of a closing curve 1.8 associated with the selector disc 1, as soon as the selector disc occupies its fading-in position. The closing curve 1.8 forms a portion of the axially effective groove 1.1 of selector disc 1 (FIG. 4), which portion rises radially between the positions "rewinding" and "fading-in."

The switch S 9 closed by the tracer finger 4.6 guarantees the start of the fading-in only when the diaphragm adjusting member is in closing position. For purposes of filming the scene beginning with the fading-in portion, the user of the camera presses the release of the camera thereby closing the release switch S 1. The flow of current is as follows: From the plus pole of the current source 22, via closed release switch S 1, contact I of the change-over switch S 6, contact I of the closed switch S 5, closed switch S 9, motor winding 9, contact II of the change-over switch S 6, to the minus pole of source 22.

Upon start of motor 9 the set of switches 21 is transferred to its closing position by switching disc 20. In this way the fading-in circuit is maintained by switch S 11 upon opening of switch S 9 by diaphragm adjusting member 4 moving in opening direction, i.e. in the direction of the arrow "IN". Release switch S 1 is bridged by the closed switch S 13 as in the previous fading-over phases.

The fading-in process is completed after one complete revolution of control disc 5 the opening curve 5.2 of which permits the tracer pin 4.1 to move from the dash-line position to the position indicated in full lines, thus transferring the diaphragm adjusting member 4 into the open position. Simultaneously, disc 20 has likewise made one complete revolution while its control notch 20.3 has moved the set of switches 21 into the open position so that by opening switch S 11 the fading-in circuit is opened at any rate, even when pressure on the release button is continued.

By the automatic opening of the fading-in circuit upon transfer of the diaphragm adjusting member 4 into the open position the user of the camera is notified about the end of the fading-in phase or about the end of the fading-over of two film scenes, in case previously a fading-out of the preceding scene and the rewinding of the faded-out film section has taken place. For further exposure of the faded-in film scene the user of the camera has to turn the selector disc 1 further by 90° into the starting position, thus closing switch S 2. In this starting position of the selector disc the fading-over device is ineffective. For the automatic drive of control disc 5 and of switching disc 20 is interrupted since clutch 17 has been disengaged by the clutch linkage 19 actuated by curve 1.3 of the selector disc 1. Simultaneously, the curve groove 1.1 of the selector disc has brought the diaphragm adjusting member 4 into its central, idling position, in which it is held in the ineffective open position by spring force (not shown). In this position of the selector disc during actuation of the release the film strip is advanced without interruption since the drive motor 9 of the camera is supplied with current solely by closing of the release switch S 1.

The necessity of switching the selector disc 1 into the starting position for further exposure of the film section following the faded-in film section, with the correct exposure value requires placing the camera on a tripod for the sliding transition of the faded-in film scene into the exposed film scene with the correct exposure value. Such transition is, in view of the short-term interruption of the film scene because of the switching of the selector disc only possible when filming non-moving objects.

In order to make possible the exposure of film scenes started with the fading-in scene with the proper exposure value under all circumstances, i.e. when filming fre-hand, the circuit of the drive motor 9 has associated therewith a relay R 14 by means of which the drive circuit is kept closed even upon completion of the fading-in process, and more specifically as long as the release of the camera is pressed. Relay R 14 at the same time renders the switch S 11 actuated by the control disc 20 ineffective so that the same may be omitted.

At the beginning of the fading-in phase the release switch S 1 is closed by pressing the release of the camera. The flow of current is as follows: From the plus pole of current source 22, via closed switch S 1, contact I of the change-over switch S 6, contact I of the closed switch S 5, closed switch S 9, then on one hand via motor winding 9, contact II of change-over switch S 6, to the minus pole of source 22, and on the other hand via relay winding R 14, contact II of the closed switch S 5, to the minus pole of source 22.

The motor starts running while the switching disc 20 transfers the set of switches 21 into the closing position during the course of the fading-in process. Consequently, switch S 13 bridges release switch S 1 until completion of the fading-in process, thus guaranteeing the complete course of the last fading-over phase in case the user of the camera should accidentally free the release of the camera. Simultaneously, the relay circuit is maintained by the relay controlled switch S 14.

The flow of current is as follows: From the plus pole of current source 22, via closed release switch S 1 or closed switch S 13, contact I of change-over switch S 6, contact I of closed switch S 5, closed relay switch S 14, then on one hand via motor winding 9 and contact II of change-over switch S 6, to the minus pole of source 22, and on the other hand via relay winding R 14, and contact II of closed switch S 5, to the minus pole of source 22.

When the fading-out phase is completed, with pressed release of the camera, the drive circuit with the above-mentioned flow is maintained until the release of the camera is freed whereupon by opening release switch S 1, the motor circuit as well as the relay circuit is interrupted. Relay 14 placed in the circuit of the motor thus makes it possible to extend the film scene started with the fading-in phase as long as is desired.

Also with this design of the camera, which makes it possible to further expose the faded-in film scene without interruption, the user of the camera is notified of the end of the fading-in phase. This is effected by clutch 17 drivingly connecting the electric camera drive 9 with discs 5 and 20. Clutch 17 is held in the engaged position by the selector disc 1 which remains even after the fading-in phase in the fading-in position. Driven portion 17.2 of clutch 17, however, upon completion of the fading-in phase is blocked by control disc 5. The latter is prevented from further rotation by abutment of the tracer pin 4.1 of adjusting member 4 at the radially extending abutment surface 5.7 of opening curve 5.2. Since the drive portion 17.1 of the engaged clutch 17 upon actuation of the release of the camera, even upon completion of the fading-in phase, is driven by motor 9, the pointed teeth of clutch portion 17.1 which axially elastically escape during rotation, slide in the manner of a ratchet on the similarly formed teeth of the driven portion 17.2 of clutch 17, which portion 17.2 is blocked by control disc 5 after the fading-in. Because of the relative sliding movement of the teeth of the clutch on each other the completion of the fading-in phase is acoustically made known to the user of the camera.

For purposes of filming subsequent scenes with the correct exposure, also in this instance the selector disc 1 is to be rotated by 90° into the shown starting position thus switching on and off the drive circuit of motor 9 merely by the release switch S 1.

The special advantage of the fade-over device according to the present invention consists in the free selection of the respective desired fading-over phase by a corresponding setting of the selector disc 1 for fading-out a film scene, for the reverse movement of the faded-out film section, or the fading-in of a film section not yet exposed or already exposed by the preceding faded-out film scene, while guaranteeing the functionally proper beginning as well as the functionally proper course of the selected fade-over phase.

It is within the framework of this invention to associate this fading-over device which permits the selection of a desired fading-over phase by means of a selector disc, with a film camera the winding spool of which is not blocked against reverse movement. The fading-over device can be adapted for such camera at any time by omitting the arresting drive 1.2, 15 and 14 for the follower 13 engaging the hub of the film winding spool.

From the above, it is apparent that although the invention has been described hereinbefore with respect to a specific embodiment thereof, it is evident that many modifications and changes may be made without departing from the spirit of the invention. Accordingly, by the appended claims, we intend to cover all such modifications and changes as fall within the true spirit and scope of this invention.

I claim:

1. A motion picture camera having diaphragm, a winding spool, a device for measuring off the same length of film for a fading-out film section and a subsequent fading-over film section, and motor means for driving said camera, which comprises a fade-over device having selector disc means adapted to be moved into a plurality of pre-selected positions for respectively preparing a plurality of fade-over phases, said fade-over device, depending on the position of said selector disc means being adapted to initiate, carry out, and complete all electric and mechanical functions necessary for the respective pre-selected fade-over phase, said selector disc means including a selector disc provided with a plurality of control curves respectively for initiating the motor-driven fading-out and fading-in phase in the proper phase, for arresting said winding spool in the proper phase, and for fixing the closing portion of the diaphragm effective during rewinding of the film in said camera, said selector disc also comprising at least one control cam for switching over said motor means to the proper position for the respective fade-over phase;

control disc means and switching disc means for effecting the phase-proper course of the fading-out and fading-in phase, for versing the movement of the film with said diaphragm closed, clutch means drivingly connectable to said motor means upon actuation by said selector disc means; a diaphragm adjusting member for effecting the fading-in and fading-out phase and adapted to be movably connected to said control and switching disc means, electric drive circuit means connected to said motor means and said control and 1switching means being adapted to maintain said circuit means closed upon closing at the beginning of a preselected fade-over phase during the entire course of the respective phase;

said control disc means including a pair of discs mounted fact to face opposite each other on a common axis said discs being provided with axially protruding, radially effective control curves on said opposing faces, one representing an opening the other a closing curve, said diaphragm adjusting member including a tracer pin for selective engagement with one and the other control curve;

said diaphragm adjusting member being displaceably guided between said discs, said selector disc means having its circumference provided with a curved groove for moving said adjusting member from an idling position between said control discs transverse to its direction of displacement into engagement with either of said closing and opening curves, depending on the fade-over phase preselected by actuation of said selector disc means.

2. A motion picture camera according to claim 1, wherein said selector disc means is adapted to be rotated to fading-in, fading-out, and rewinding positions, latch means controlled by one of said plurality of control curves of said selector disc means and adapted to maintain said diaphragm adjusting member in closed position when said selector disc means occupies said rewinding position, said selector disc means having associated therewith a radially effective control curve adapted to automatically transfer said diaphragm adjusting member into its closing position upon rotation of said selector disc means from said rewinding position to said fading-in position.

3. A motion picture camera according to claim 2, wherein said radially effective control curve is integrally connected to said curved groove.

4. A motion picture camera having diaphragm, a winding spool, a device for measuring off the same length of film for a fading-out film section and a subsequent fadingeover film section, and motor means for driving said camera, which comprises a fade-over device having selector disc means adapted to be moved into a plurality of preselected positions for respectively preparing a plurality of fade-over phases, said fade-over device, depending on the position of said selector disc means being adapted to initiate, carry out, and complete all electric and mechanical functions necessary for the respective preselected fade-over phase, said selector disc means including a selector disc provided with a plurality of control curves respectively for initiating the motor-driven fading-out and fading-in phase in the proper phase, for arresting said winding spool in the proper phase, and for fixing the closing portion of the diaphragm effective during rewinding of the film in said camera, said selector disc also comprising at least one control cam for switching over said motor means to the proper position for the respective fade-over phase;

control disc means and switching disc means for effecting the phase-proper course of the fading-out and fading-in phase, for versing the movement of the film with said diaphragm closed, clutch means drivingly connectable to said motor means upon actuation by said selector means; a diaphragm adjusting member for effecting the fading-in and fading-out phase and adapted to be movably connected to said control and switching disc means, electric drive circuit means connected to said motor means and said control and switching disc means, said control and switching means being adapted to maintain said circuit means closed upon closing at the beginning of a preselected fade-over phase during the entire course of the respective phase;

a control finger associated with said diaphragm adjusting member and a plurality of switches provided in said electric drive circuit means, said control finger being adapted to actuate the respective switch only if the position of said diaphragm adjusting member is proper for initiating the respective fade-out, rewinding, or fading-in phase.

5. A motion picture camera having diaphragm, a winding spool, a device for measuring off the same length of film for a fading-out film section and a subsequent fading-over film section, and motor means for driving said camera, which comprises a fade-over device having selector disc means adapted to be moved into a plurality of pre-selected positions for respectively preparing a plurality of fade-over phases, said fade-over device, depending on the position of said selector disc means being adapted to initiate, carry out, and complete all electric and mechanical functions necessary for the respective pre-selected fade-over phase.

said selector disc means including a selector disc provided with a plurality of control curves respectively for initiating the motor-driven fading-out and fading-in phase in the proper phase, for arresting said winding spool in the proper phase, and for fixing the closing portion of the diaphragm effective during rewinding of the film in said camera, said selector disc also comprising at least one control cam for switching over said motor means to the proper position for the respective fade-over phase;

control disc means and switching disc means for effecting the phase-proper course of the fading-out and fading-in phase, for versing the movement of the film with said diaphragm closed, clutch means drivingly connectable to said motor means upon actuation by said selector disc means; a diaphragm adjusting member for effecting the fading-in and fading-out phase and adapted to be movably connected to said control and switching disc means, electric drive circuit means connected to said motor means and said control and switching disc means, said control and switching means being adapted to maintain said circuit means closed upon closing at the beginning of a pre-selected fade-over phase during the entire course of the respective phase;

said switching disc means being arranged for synchronous rotation with said control disc means and having a circumferential switching notch, a set of switches having extension means extending into the path of said switch disc means and being adapted to be closed thereby when said extension means are received in said notch during each revolution, the switches of said set of switches maintaining said circuit means closed until completion of the respective fade-over phase pre-selected by actuation of said selector disc means.

6. A motion picture camera having a diaphragm, a winding spool, a device for measuring off the same length of film for a fading-out film section and a subsequent fading-over film section, and motor means for driving said camera, which comprises a fade-over device having selector disc means adapted to be moved into a plurality of pre-selected positions for respectively preparing a plurality of fade-over phases, said fade-over device, depending on the position of said selector disc means being adapted to initiate, carry out, and complete all electric and mechanical functions necessary for the respective pre-selected fade-over phase;

said selector disc means being rotatable from a starting position to any one of three further positions defining respectively, fading-in, rewinding and fading-out phases, said positions corresponding respectively to normal film transport, fading-in, rewinding and fading out portions of said selector disc means, said selector disc means further being rotatable to and from each position to another, the normal film transport of said camera in said starting position being free from interference with said fade-over device, said selector disc means when being rotated in the same direction through a plurality of said portions consecutively preparing said fade-over phases for the complete fade-over of two film scenes.

7. A motion picture camera according to claim 6, which includes manually operable means rotatable to a limited extent about the axis of rotation of said selector disc means, resilient means interconnecting said manually operable means and said selector disc means, said manually operable means being movable into a position corresponding to the fade-out position while tensioning said resilient means, latch means for holding said selector disc means in said starting position, during the advance of a film section starting position, during the advance of a film section through said camera said selector disc means upon release of said latch means being abruptly moved into said fading-out position by said tensioned resilient means.

8. A motion picture camera having a diaphragm, a winding spool, a device for measuring off the same length of film for a fading-out film section and a subsequent fading-over film section, and motor means for driving said camera, which comprises a fade-over device having selector disc means adapted to be moved into a plurality of pre-selected positions for respectively preparing a plurality of fade-over phases, said fade-over device, depending on the position of said selector disc means being adapted to initiate, carry out, and complete all electric and mechanical functions necessary for the respective pre-selected fade-over phase, said selector disc means including a selector disc provided with a plurality of control curves respectively for initiating the motor-driven fading-out and fading-in phase in the proper phase, for arresting said winding spool in the proper phase, and for fixing the closing portion of the diaphragm effective during rewinding of the film in said camera, said selector disc also comprising at least one control cam for switching over said motor means to the proper position for the respective fade-over phase;

a control disc means and switching disc means for effecting the phase-proper course of the fading-out and fading-in phase, for versing the movement of the film with said diaphragm closed, clutch means drivingly connectable to said motor means upon actuation by said selector disc means; a diaphragm adjusting member for effecting the fading-in and fading-out phase and adapted to be movably connected to said control and switching disc means, electric drive circuit means connected to said motor means and said control and switching disc means, said control and switching means being adapted to maintain said circuit means closed upon closing at the beginning of a pre-selected fade-over phase during the entire course of the respective phase;

relay means associated with said fade-over device and arranged in said circuit for said motor drive means, and a release associated with said circuit, said relay being adapted to keep said circuit closed upon completion of the fade-in phase while said release has been freed, thereby performing transition from said fade-in phase to the normal film scene.

9. A motion picture camera according to claim 8, wherein said clutch means has a driving portion drivingly connected to said motor means and a driven portion, each provided with gear teeth for meshing engagement of said two portions, said driving portion being mounted for resilient yielding movement in axial direction, said control disc means being adapted to block rotation of said driven portion upon completion of the fade-in phase, and means for keeping said motor means drive circuit means closed upon completion of said fade-in phase, whereby relative ratchet-like movement of said driving and driven portions acoustically indicates completion of said fade-in phase.

* * * * *